United States Patent
Matsumoto et al.

(10) Patent No.: US 6,846,466 B2
(45) Date of Patent: Jan. 25, 2005

(54) CATALYST FOR PURIFYING AN EXHAUST GAS

(75) Inventors: Shigeji Matsumoto, Ogasa-gun (JP); Koichi Kasahara, Ogasa-gun (JP); Yasunori Sato, Ogasa-gun (JP)

(73) Assignee: Cataler Corporation, Shizuoka (JP)

( * ) Notice: Subject to any disclaimer, the term of this patent is extended or adjusted under 35 U.S.C. 154(b) by 871 days.

(21) Appl. No.: 09/803,908

(22) Filed: Mar. 13, 2001

(65) Prior Publication Data

US 2001/0031699 A1 Oct. 18, 2001

(30) Foreign Application Priority Data

Mar. 22, 2000 (JP) ........................................ 2000-080478
Mar. 22, 2000 (JP) ........................................ 2000-080482

(51) Int. Cl.[7] ........................... B01D 50/00; B01D 53/34
(52) U.S. Cl. ......................................... 422/180; 422/169
(58) Field of Search ................................. 422/180, 168, 422/169, 177

(56) References Cited

U.S. PATENT DOCUMENTS 5,878,567 A * 3/1999 Adamczyk et al. ............ 60/274
5,948,723 A   9/1999 Sung

FOREIGN PATENT DOCUMENTS

| EP | 0 786 284 A1 | 7/1997 |
|----|---|---|
| JP | B2 2690661 | 8/1997 |
| JP | A 10-249200 | 9/1998 |
| WO | WO 96/17671 | 6/1996 |
| WO | WO 97/23278 | 7/1997 |
| WO | WO 97/43035 | 11/1997 |

\* cited by examiner

Primary Examiner—M. Alexandra Elve
(74) Attorney, Agent, or Firm—Oliff & Berridge, PLC

(57) ABSTRACT

A catalyst for purifying an exhaust gas includes an upstream side catalyst and a downstream side catalyst. The upstream side catalyst is disposed on an upstream side with respect to an exhaust gas flow, and the downstream side catalyst is disposed on a downstream side with respect thereto. The upstream side catalyst includes a first loading layer, being composed of an alumina containing Ba and La at least, and a first noble metal, being held by the first loading layer and being at least one member selected from the group consisting of Pd, Pd and Rh and Pd and Pt. Alternatively, in addition to the aluminum, the first loading layer can be composed of Ce, a solid solution of Ce and Zr and a solid solution of Ce, Zr and Y in an amount as less as possible. The downstream side catalyst includes a second loading layer, being composed of at least one member selected from the group consisting of an alumina containing La, Ce, a solid solution of Ce and Zr and a solid solution of Ce, Zr and Y, and a second noble metal, being held by the second loading layer and being composed of at least one member selected from the group consisting of Pt, Pd and Rh.

33 Claims, 6 Drawing Sheets

CATALYST FOR PURIFYING AN EXHAUST GAS

BACKGROUND OF THE INVENTION

1. Field of the Invention

The present invention relates to a tandem type catalyst for purifying an exhaust gas, which comprises an upstream side catalyst and a downstream side catalyst.

2. Description of the Related Art

It has been required to further reduce the hydrocarbons (HC), carbon monoxide (CO) and nitrogen oxides ($NO_x$) emissions because of the recent strengthening of the regulation on exhaust gases emitted from automobiles. Many of the conventional catalysts for purifying an exhaust gas comprises a composite oxide, which includes cerium oxide or cerium, in a fire resistant inorganic oxide, such as an alumina, and the like, serving as a loading layer. For example, in Japanese Patent Publication No. 2,690,661, there is disclosed a monolithic support catalyst. The monolithic support catalyst comprises: an exhaust gas inlet side catalyst, which includes a loading layer being composed of palladium, an alkaline-earth metal oxide, a lanthanum oxide, an activated alumina and a composite or solid solution of a cerium oxide and a zirconium oxide in predetermined amounts, respectively; and an exhaust gas outlet side catalyst, which includes a noble metal and a fire resistant inorganic oxide. In this publication, there is a description to the effect that the positions of the upstream side catalyst and the downstream side catalyst can be disposed inversely. In this case, however, their may possibly arise a drawback in that the purifying performances of the CO and $NO_x$, which are contained in an exhaust gas, are so insufficient that the standards of the strengthening regulation on exhaust gases cannot be satisfied sufficiently.

Moreover, in Japanese Unexamined Patent Publication (KOKAI) No. 10-249,200, there is disclosed an integrated catalyst. In this catalyst, in order to particularly enhance the purifying performance of the $NO_x$, a particle diameter and using amount of a barium compound are controlled. The catalyst has a loading layer, which is formed by using palladium as a catalyst ingredient. In this case, however, there may emerge a disadvantage in that the purifying performance of the HC is not sufficient.

The present invention has been developed in view of the aforementioned circumstances. It is an object of the present invention to provide a catalyst for purifying an exhaust gas, which can maintain the purifying performance of the HC, conforming to the standard of the strengthening regulation on automobile exhaust gases, and whose purifying performances of the CO and $NO_x$ are improved simultaneously.

The inventors of the present invention discovered that it was possible, while sustaining the purifying performance of the HC, to upgrade the purifying performances of the CO and $NO_x$ by using two catalysts, an upstream side catalyst and a downstream side catalyst, with respect to an exhaust gas flow and by making the upstream side catalyst free from cerium or by reducing an amount of cerium contained therein as less as possible. Thus, they completed the present invention.

An exhaust gas purifying catalyst according to the present invention is characterized in that it comprises:

an upstream side catalyst disposed on an upstream side with respect to an exhaust gas flow and including: a first cylinder-shaped support having a plurality of through holes penetrating therethrough in an axial direction; a first fire resistant inorganic oxide loading layer being formed on inner surfaces demarcating the through holes; and a first catalyst ingredient being held by the first loading layer and being composed of a first noble metal;

a downstream side catalyst disposed on a downstream side with respect to the exhaust gas flow and including: a second cylinder-shaped support having a plurality of through holes penetrating therethrough in an axial direction; a second fire resistant inorganic oxide loading layer being formed on inner surfaces demarcating the through holes; and a second catalyst ingredient being held by the second loading layer and being composed of a second noble metal;

the upstream side catalyst being constituted by the first catalyst ingredient, being composed of at least one member selected from the group consisting of palladium, palladium and rhodium and palladium and platinum as the first noble metal, and the first loading layer, being composed of an alumina containing barium and lanthanum at least; and the downstream side catalyst being constituted by the second catalyst ingredient, being composed of at least one member selected from the group consisting of platinum, palladium and rhodium as the second noble metal, and the second loading layer, being composed of at least one member selected from the group consisting of an alumina containing lanthanum, cerium, a solid solution of cerium and zirconium and a solid solution of cerium, zirconium and yttrium.

In the present catalyst for purifying an exhaust gas, it is preferred that a ratio of the palladium to the barium can be Pd:Ba=1.0:100–1.0:1.0 by elemental weight in the upstream side catalyst.

In the present catalyst for purifying an exhaust gas, it is preferred that a volume ratio of the upstream side catalyst to the downstream side catalyst can be the upstream side catalyst: the downstream side catalyst=1.0:10–3.0:1.0.

In the present catalyst for purifying an exhaust gas, it is preferred that the upstream side catalyst and the downstream side catalyst can be formed on and/or within an identical support.

The present catalyst for purifying an exhaust gas is constituted by a pair of catalysts, an upstream side catalyst disposed on an upstream side with respect to an exhaust gas flow and a downstream side catalyst disposed on a downstream side with respect thereto, upstream side catalyst and downstream side catalyst which include a cylinder-shaped support having a plurality of through holes penetrating therethrough in an axial direction, a fire resistant inorganic oxide loading layer being formed on inner surfaces demarcating the through holes, and a catalyst ingredient being held by the loading layer and being composed of a noble metal, respectively.

The upstream side catalyst and the downstream side catalyst can be disposed on an upstream side and a downstream side, respectively, with respect to an exhaust gas flow in a neighboring manner or by providing a suitable interval therebetween. The exhaust gas is passed from the upstream side to the downstream side through both of the above-described catalysts, thereby carrying out the purification of the HC, CO and $NO_x$, and is discharged to the outside.

As for the first and second supports, they are formed as a cylinder shape, which has a plurality of through holes penetrating in an axial direction, and are accordingly formed as such a configuration that an exhaust gas passes through the through holes. It is possible, for example, to use both of a substrate, which is made from a ceramic and has honeycomb-shaped through holes, and a substrate, which is made of a metal and has honeycomb-shaped through holes. The ceramic substrate and the metallic substrate can be those used usually as a support.

The upstream side catalyst is constituted by the first catalyst ingredient, being composed of at least one member selected from the group consisting of palladium, palladium and rhodium and palladium and platinum as the first noble metal, and the first loading layer, being composed of an alumina containing barium and lanthanum at least.

One of the characteristics of the present exhaust gas purifying catalyst lies in that the first loading layer of the upstream side catalyst can be free from cerium elements or can contain them in an amount as less as possible, and that only the second loading layer of the downstream side catalyst can be loaded with a relatively large amount of cerium elements.

On the inner surfaces of the through holes of the first and second supports, the first and second heat resistant inorganic oxides, loaded with the first and second noble metals, are formed as the first and second loading layers, respectively. In the upstream side catalyst and downstream side catalyst, the elemental compositions of the first noble metal and first fire resistant inorganic oxide, which form the first loading layer, or the compounding amounts thereof differ from those of the second noble metal and second fire resistant inorganic oxide, which form the second loading layer.

The first fire resistant inorganic oxide, which forms the first loading layer of the upstream side catalyst, can be constituted by an alumina, which contains barium elements and lanthanum elements at least, and optionally the cerium elements, the cerium elements and the zirconium elements and the cerium elements, the zirconium elements and the yttrium elements. Among them, the cerium elements can be stabilized and the content thereof can be reduced by dissolving them in the zirconium elements or in the zirconium elements and the yttrium elements.

The first loading layer of the upstream side catalyst is constituted by an alumina containing barium elements and lanthanum elements at least. The lanthanum elements operate to heighten the thermal stability of an alumina and/or an activated alumina. It is preferred that the lanthanum elements can be dissolved in the alumina. The barium elements are known as an adsorbent of the $NO_x$. When the barium elements are used along with a noble metal such as palladium, etc., there arises an advantageous effect in that the conversion performance of the $NO_x$ is inhibited from decreasing. The decrement of the conversion performance of the $NO_x$ results from the palladium, etc., which are subjected to the adsorption poisoning caused by the HC. When the contents of the palladium elements and the barium elements deviate from the aforementioned range (e.g., Pd:Ba= 1.0:100–1.0:1.0 by elemental weight), it is not preferred because the conversion efficiency of the $NO_x$ diminishes. It is preferred that the barium elements can be dispersed as oxide particles with the alumina.

Concerning the quantitative ratios of the barium elements and lanthanum elements, it is preferred that the barium elements can exist in an amount of from 1.0 to 100 g with respect to 1 liter of the upstream side catalyst volume, and that the lanthanum elements can exist in an amount of from 0.8 to 8.0 g, further preferably from 1.0 to 7.0 g, with respect to 1 liter of the upstream side catalyst volume. It is preferred that the alumina can be an activated alumina, and that it can exist in an amount of from 50 to 200 g with respect to 1 liter of the upstream side catalyst volume.

It is possible for the first loading layer of the upstream side catalyst in the present catalyst for purifying an exhaust gas to be further composed of at least one member selected from the group consisting of cerium, a solid solution of cerium and zirconium and a solid solution of cerium, zirconium and yttrium.

For example, in the first loading layer of the upstream side catalyst, it is preferred that an amount of the cerium elements, contained therein, can fall in a range of from 0.01 to 0.1 mol, further preferably in a range of from 0.01 to 0.05 mol, with respect to 1 liter of the upstream side catalyst volume.

When the amount of the cerium elements contained in the upstream side catalyst exceeds 0.1 mol, it is not preferred for an exhaust gas purifying catalyst as a whole because the conversion of the HC decreases so that the downstream side catalyst cannot compensate for the decrement. It is further preferred that the amount of the cerium elements can be 0.05 mol or less. When the content of the cerium elements is less, it is preferred because the cerium elements can exist as a solid solution together with the zirconium elements or as a solid solution together with the zirconium elements and the yttrium elements so that the thermal stability of the cerium elements can be furthermore enhanced.

It is preferred that, in the first loading layer of the upstream side catalyst, the quantitative ratio of the cerium elements to the zirconium elements can fall in a range of Ce:Zr=2.0:1.0–1.0:2.0 by elemental weight. It is further preferred that, in the first loading layer of the upstream side catalyst, the quantitative ratio of the cerium elements to the zirconium elements as well as to the yttrium elements can fall in a range of Ce:Zr:Y=2.0:1.00.1–0.42–1.0:2.0:0.2–0.84 by elemental weight.

It is preferred that, in the first loading layer of the upstream side catalyst, the respective elements, the barium elements, the lanthanum elements and/or the cerium elements, are loaded in the alumina in an amount of from 10 to 30 g for the barium elements, in an amount of from 3.0 to 5.0 g for the lanthanum elements and/or in an amount of from 0.6 to 2.0 g for the cerium elements, respectively, with respect to 100 g of the alumina.

The lanthanum operates to heighten the thermal stability of an alumina and/or an activated alumina. The lanthanum can be contained in the alumina. It is further preferred that the lanthanum is dissolved in the alumina.

As for the first noble metal of the upstream side catalyst, at least one member can be used which is selected from the group consisting of palladium, palladium and rhodium and palladium and platinum. It is preferred that, in order to enhance the purifying performances of the upstream side catalyst, the first noble metal can be loaded in an amount of from 0.01 to 10 g with respect to 1 liter of the upstream side catalyst volume.

Concerning the loading amounts of the respective noble metals, it is preferred that the palladium can be used in an amount of from 0.01 to 10 g with respect to 1 liter of the upstream side catalyst volume. When the platinum or the rhodium is used along with the palladium, it is desirable, in view of the purifying efficiencies and the costs, to use the palladium in an amount of from 0.01 to 5.0 g with respect to 1 liter of the upstream side catalyst volume, the rhodium in an amount of from 0 to 1.0 g with respect thereto and the platinum in an amount of from 0 to 5.0 g with respect thereto.

There arises an interaction between the barium and the noble metal, such as the palladium, and so on. Namely, it is believed that the conversion performance of the $NO_x$ is degraded because the palladium is subjected to the adsorption poisoning by the HC in an exhaust gas, which is under a fuel-rich condition. Accordingly, when the barium exists, it is possible to diminish the HC adsorption poisoning of the palladium. As set forth above, in order to bring about the advantageous effects, it is preferred that a ratio of the palladium to the barium can be Pd:Ba=1.0:100–1.0:1.0 by elemental weight. When the ratio deviates out of the range, it is not preferable because the conversion efficiency of the $NO_x$ decreases.

It is assumed that the upstream side catalyst operates in the following manner. Since the upstream side catalyst does not include the cerium elements as a constituent member of the first loading layer or includes them in an amount as less as possible, the oxygen, which is contained in an exhaust gas, is inhibited from being fully consumed by the cerium elements in a catalyst system, and accordingly the ambient atmosphere is inhibited from being a reducing atmosphere. Thus, the upstream side catalyst produces a much more oxidizing atmosphere, oxidizes the HC by the first noble metal so that the HC purifying performance is upgraded, and compensates for the insufficiency of the HC purifying ability in the downstream side catalyst. In addition, it is also possible to enhance the conversion efficiencies of the CO and $NO_x$ in the downstream side catalyst.

The downstream side catalyst is constituted by the second catalyst ingredient, being composed of at least one member selected from the group consisting of platinum, palladium and rhodium as the second noble metal, and the second loading layer, being composed of at least one member selected from the group consisting of an alumina containing lanthanum, cerium, a solid solution of cerium and zirconium and a solid solution of cerium, zirconium and yttrium.

The second noble metal is loaded in the second loading layer so that the harmful components, which are contained in an exhaust gas and which cannot be purified sufficiently by the upstream side catalyst, are purified on the alumina, which is thermally stabilized by the lanthanum.

As for the second noble metal, it is possible to use the platinum, the palladium and the rhodium independently or to use them combinedly. When the second noble metal is used independently, it is effective, in order to maintain the purifying performances, to use it in an amount of from 0.05 to 10 g, further preferably from 0.05 to 5.0 g, with respect to 1 liter of the downstream side catalyst volume in view of the catalytic activity. Since the noble metal is expensive, it is desirable to use it in an amount as small as possible so that it falls in the range, which can sustain the advantageous effects. When they are used combinedly, it is preferred that, taking the purifying efficiencies and the costs into consideration, the platinum can be used in an amount of from 0.05 to 1.0 g, the palladium can be used in an amount of from 0.05 to 2.0 g, and the rhodium can be used in an amount of from 0.05 to 0.3 g, respectively, with respect to 1 liter of the downstream side catalyst volume, because they are expensive. Thus, it is possible to obtain desired purifying effects.

The second loading layer of the downstream side catalyst is constituted by at least one member selected from the group consisting of an alumina containing lanthanum, cerium, a solid solution of cerium and zirconium and a solid solution of cerium, zirconium and yttrium. Contrary to the upstream side catalyst, since the downstream side catalyst includes the cerium elements in a relatively large amount, the atmosphere in the downstream side catalyst is made into a much more reducing atmosphere, and thereby it is possible to enhance the conversion efficiencies of the CO and $NO_x$.

The second loading layer of the downstream side catalyst can include the alumina, containing the lanthanum elements, and the cerium elements. The cerium elements can form a solid solution together with the zirconium elements, or can form a solid solution together with the zirconium elements and the yttrium elements.

The alumina containing the lanthanum elements can be the same as the one used in the upstream side catalyst. For example, when the lanthanum elements are contained in an amount of from 3.0 to 5.0 g with respect to 100 g of the alumina, it is preferred because the activity and durability of the alumina can be sustained at elevated temperatures.

In the downstream side catalyst, it is preferred that the second loading layer can contain the lanthanum elements in an amount of from 0.8 to 4.5 g with respect to 1 liter of the downstream side catalyst and the alumina in an amount of from 50 to 250 g with respect thereto. It is preferred that, in order to upgrade the purifying effects and durability of the catalyst, the cerium elements can be present independently. Alternatively, it is preferred that they can be present as a solid solution of the cerium elements and the zirconium elements or a solid solution of the cerium elements, the zirconium elements and the yttrium elements.

Since the cerium elements exist in the downstream side catalyst, the CO and $NO_x$, which have not been purified sufficiently by the upstream side catalyst, can be reduced and purified. Thus, the present exhaust gas purifying catalyst can effect the improved purifying performances as an exhaust gas purifying catalyst as a whole.

The amount of the cerium elements, contained in the second loading layer of the downstream side catalyst, can be made relatively larger than that of the upstream side catalyst. For example, the cerium elements can preferably exist in the second loading layer in an amount of from 28 to 112 g (i.e., from 0.2 to 0.8 mol), further preferably from 42 to 112 g (i.e., from 0.3 to 0.8 mol), with respect to 1 liter of the downstream side catalyst volume. In order to distinctively enhance the $N_x$ conversion efficiency, it is preferred that, the zirconium elements, forming a solid solution together with the cerium elements, can preferably exist so that Ce:Zr= 2.0:1.0–1.0:2.0 by elemental weight. Further, the yttrium elements, forming a solid solution together with the cerium elements and the zirconium elements, can preferably exist so that a ratio of Zr to Y is Zr:Y=10:1.0–7.0:3.0 by elemental weight.

Moreover, it is possible to make the amount of the second loading layer of the downstream side catalyst lesser than the amount of the first loading layer of the upstream side catalyst.

In the case where the above-described upstream side catalyst and downstream side catalyst are disposed in a pair in an exhaust gas passage, it is preferred that, in order to produce well balanced purifying performances as an exhaust gas purifying catalyst as a whole, a volume ratio of the both of them can fall in a range of the upstream side catalyst: the downstream side catalyst=1.0:10–3.0:1.0, further preferably, in a range of the upstream side catalyst the downstream side catalyst=2.0:8.0–7.0:3.0 as can be understood from FIG. 4 or 8 and FIG. 5 or 9. By adjusting the volume ratio of the both of the catalysts so as to fall within the range, the purifying efficiencies (or conversion efficiencies) of the HC, CO and $NO_x$ are enhanced so that it is possible to clear the strengthening exhaust gas regulation, which imposes the severe conditions.

The upstream side catalyst and the downstream side catalyst can be disposed in an exhaust gas passage unitedly. When they are neighboring with each other as illustrated in FIG. 10, or when they are disposed away from each other by providing an interval between them as illustrated in FIG. 11, it is possible to obtain similar purifying effects.

In addition, even when the first loading layer of the upstream side catalyst and the second loading layer of the downstream side catalyst are formed on and/or within a single support, it is possible to expect similar advantageous effects.

The downstream side catalyst is loaded with at least one member selected from the group consisting of platinum, palladium and rhodium. It is possible to reduce and purify harmful components, which have not been purified sufficiently by the upstream side catalyst, by the second loading layer of the above-described composition and at least one of the aforementioned second noble metals.

In the downstream side catalyst, since the cerium elements are present in the second loading layer, an atmosphere, which is different from the ambient atmosphere of the upstream side catalyst, is formed. Accordingly, it is possible to purify the CO and $NO_x$, which have not been purified sufficiently by the upstream side catalyst. Thus, the upstream side catalyst and the downstream side catalyst operate unitedly so that it is possible to upgrade the performances of an exhaust gas purifying catalyst as a whole.

Moreover, it is possible to obtain a catalyst for purifying an exhaust gas, catalyst which produces the similar advantageous effects, by continuously forming the upstream side first loading layer and the downstream side second loading layer on and/or within an identical support. For example, in the formation of the first and second loading layers, a desired loading layer (e.g., the first loading layer) can be formed first by coating on and/or within one of the opposite sides of a support only, and the rest of the loading layer (e.g., the other or second loading layer) can be formed thereafter by coating on and/or within the other opposite side of the support.

In accordance with the exhaust gas purifying catalyst of the present invention, the composition of the first heat resistant inorganic oxide loading layer of the upstream side catalyst is made different from that of the second heat resistant inorganic oxide loading layer of the downstream side catalyst, and the cerium elements are made to exist only in the downstream side catalyst and/or they were contained in the reduced amount in the upstream side catalyst as well. Thus, the upstream side catalyst and downstream side catalyst share and compensate for the purifying functions with each other, thereby not only improving the purifying performance of the HC in an exhaust gas but also furthermore enhancing the purifying performances of the CO and $NO_x$ therein simultaneously. As a result, a novel exhaust gas purifying catalyst can be obtained, which can reveal much higher purifying performances. Accordingly, it is possible to satisfy the standards of the regulation even under the severe conditions of the strengthening exhaust gas emission regulation.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The exhaust gas purifying catalyst according to the present invention will be hereinafter described in detail with reference to examples and comparative examples.

Figure 12:
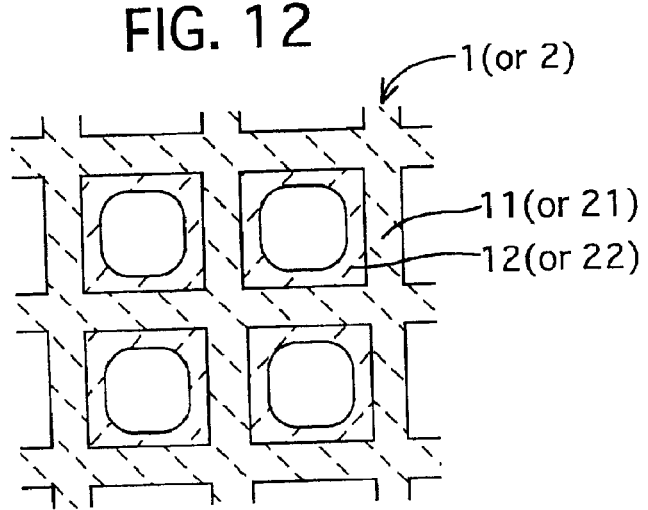
FIG. 12 is a partially enlarged schematic cross sectional view of an upstream side catalyst or a downstream side catalyst in a catalyst for purifying an exhaust gas according to the present invention.

For example, as illustrated in FIG. 12, a catalyst for purifying an exhaust gas according to the present invention comprises an upstream side catalyst 1, which includes a first cylinder-shaped support 11 and a first fire resistant inorganic oxide loading layer 12 formed on the inner surfaces of the first cylinder-shaped support 11, and a downstream side catalyst 2, which includes a second cylinder-shaped support 21 and a second fire resistant inorganic oxide loading layer 22 formed on the inner surfaces of the second cylinder-shaped support 21.

EXAMPLE NO. 1

(Upstream Side Catalyst)

120 g of an alumina, containing 3.9 g of lanthanum, 39.6 g of barium sulfate and 40 g of an alumina sol were mixed and stirred to make a slurry. To this slurry, a palladium aqueous solution, which was equivalent to 1.5 g by conversion into Pd, was added, and was fully stirred so as to load it on the alumina, thereby preparing a slurry for coating. The resulting slurry was coated on a support, whose volume was about 500 cm$^3$ and which was made from cordierite, and was dried thereafter. Thus, the support was made into an upstream side catalyst. Note that the ratio of Pd to Ba was 1.0:15.5 (i.e., Pd:Ba=1.0:15.5) by elemental weight.

(Downstream Side Catalyst)

120 g of an alumina, containing 3.9 g of lanthanum, 52 g of a cerium oxide solid solution, including zirconium and yttrium, and 40 g of an alumina sol were mixed and stirred fully to make a slurry. Note that the elemental composition ratio of the cerium oxide solid solution was Ce:Zr:Y=10:9.0:1.0 by elemental weight. To this slurry, a platinum aqueous solution was added, and was fully stirred, thereby making a slurry, in which the platinum was loaded on the alumina and on the cerium oxide solid solution including zirconium and yttrium. As for the platinum aqueous solution, it was equivalent to 1.0 g by conversion into Pt. The resulting slurry was coated on a support, whose volume was about 1,000 cm$^3$ and which was made from cordierite, and was dried. The support was thereafter immersed into a rhodium aqueous solution to load Rh on the support, was dried, and was thereafter made into a downstream side catalyst. As for the rhodium aqueous solution, it was equivalent to 0.2 g by conversion into Rh.

Note that a ratio of the volume of the upstream side catalyst (500 cm$^3$) to the volume of the downstream side catalyst (1,000 cm$^3$) was 1.0:2.0 (i.e., the upstream side catalyst: the downstream side catalyst=1.0:2.0).

EXAMPLE NO. 2

Except that 0.75 g of palladium and 0.75 g of platinum substituted for the noble metal in the upstream side catalyst of Example No. 1, an upstream side catalyst of Example No. 2 was prepared in the same manner as that of Example No. 1.

As for a downstream side catalyst, a catalyst was used which was prepared in the same manner as that of Example No. 1.

Note that the ratio of the palladium to the barium was 1.0:31.0 (i.e., Pd:Ba=1.0:31.1) by elemental weight in the upstream side catalyst.

EXAMPLE NO. 3

Except that 1.35 g of palladium and 0.15 g of rhodium substituted for the noble metal in the upstream side catalyst of Example No. 1, an upstream side catalyst of Example No. 3 was prepared in the same manner as that of Example No. 1.

As for a downstream side catalyst, a catalyst was used which was prepared in the same manner as that of Example No. 1.

Note that the ratio of the palladium to the barium was 1.0:17.3 (i.e., Pd:Ba=1.0:17.3) by elemental weight in the upstream side catalyst.

EXAMPLE NO. 4

Except that the amount of the barium sulfate was adjusted to twice (79.2 g) that of the upstream side catalyst of Example No. 1, and that the coating amount was increased to 178 g with respect to 1 liter of a resulting upstream side catalyst, an upstream side catalyst of Example No. 4 was prepared in the same manner as that of Example No. 1.

As for a downstream side catalyst, a catalyst was used which was prepared in the same manner as that of Example No. 1.

Note that the ratio of the palladium to the barium was 1.0:31.1 (i.e., Pd:Ba=1.0:31.1) by elemental weight in the upstream side catalyst.

EXAMPLE NO. 5

Except that the amount of the barium sulfate was adjusted to half (19.8 g) that of the upstream side catalyst of Example No. 1, and that the coating amount was reduced to 142 g with respect to 1 liter of a resulting upstream side catalyst, an upstream side catalyst of Example No. 5 was prepared in the same manner as that of Example No. 1.

As for a downstream side catalyst, a catalyst was used which was prepared in the same manner as that of Example No. 1.

Note that the ratio of the palladium to the barium was 1.0:7.8 (i.e., Pd:Ba=1.0:7.8) by elemental weight in the upstream side catalyst.

COMPARATIVE EXAMPLE NO. 1

Except that 86 g of cerium oxide was added to make a slurry for coating in the preparation of the upstream side catalyst of Example No. 1, and that the coating amount was increased to 240 g with respect to 1 liter of a resulting upstream side catalyst, an upstream side catalyst of Comparative Example No. 1 was prepared in the same manner as that of Example No. 1.

As for a downstream side catalyst, a catalyst was used which was prepared in the same manner as that of Example No. 1.

COMPARATIVE EXAMPLE NO. 2

Except that a cerium oxide solid solution including zirconium was used instead of the cerium oxide in the preparation of the upstream side catalyst of Comparative Example No. 1, an upstream side catalyst of Comparative Example No. 2 was prepared in the same manner as that of Comparative Example No. 1. Note that the elemental composition ratio of the cerium to the zirconium was 1.0:1.0 (i.e., Ce:Zr=1.0:1.0) by elemental weight in the cerium oxide solid solution.

As for a downstream side catalyst, a catalyst was used which was prepared in the same manner as that of Example No. 1.

COMPARATIVE EXAMPLE NO. 3

Except that a cerium oxide solid solution including zirconium and yttrium was used instead of the cerium oxide in the preparation of the upstream side catalyst of Comparative Example No. 1, an upstream side catalyst of Comparative Example No. 3 was prepared in the same manner as that of Comparative Example No. 1. Note that the elemental composition ratio of the cerium to the zirconium as well as to the yttrium was 10:9.0:1.0 (i.e., Ce:Zr:Y=10:9.0:1.0) by elemental weight in the cerium oxide solid solution.

As for a downstream side catalyst, a catalyst was used which was prepared in the same manner as that of Example No. 1.

COMPARATIVE EXAMPLE NO. 4

Except that the amount of the cerium oxide was adjusted to 43 g (half of the amount in Comparative Example No. 1) in the preparation of the upstream side catalyst of Comparative Example No. 1, and that the coating amount was reduced to 197 g with respect to 1 liter of a resulting upstream side catalyst, an upstream side catalyst of Comparative Example No. 4 was prepared in the same manner as that of Comparative Example No. 1.

As for a downstream side catalyst, a catalyst was used which was prepared in the same manner as that of Example No. 1.

On the upstream side catalysts of the respective catalysts described above, Table 1 summarizes the contents of the respective components with respect to 1 liter of the respective upstream side catalysts.

Figure 3:
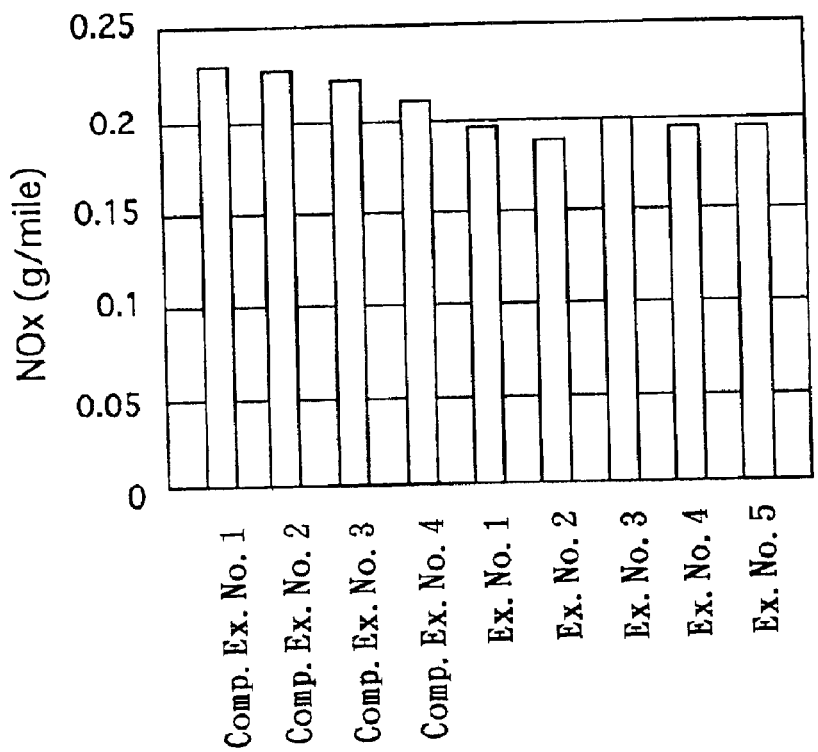
FIG. 3 is a bar graph for showing the $NO_x$ conversions, which were exhibited by the respective catalysts of Example Nos. 1 through 5 and Comparative Example Nos. 1 through 4.

FIG. 3 illustrates the results of the $NO_x$ conversion measurements. It is appreciated from the drawing that the respective catalysts of Example Nos. 1 through 5 exhibited higher $NO_x$ conversions (or lower $NO_x$ emissions) than those of the respective catalysts of Comparative Example Nos. 1 through 4.

Figure 4:
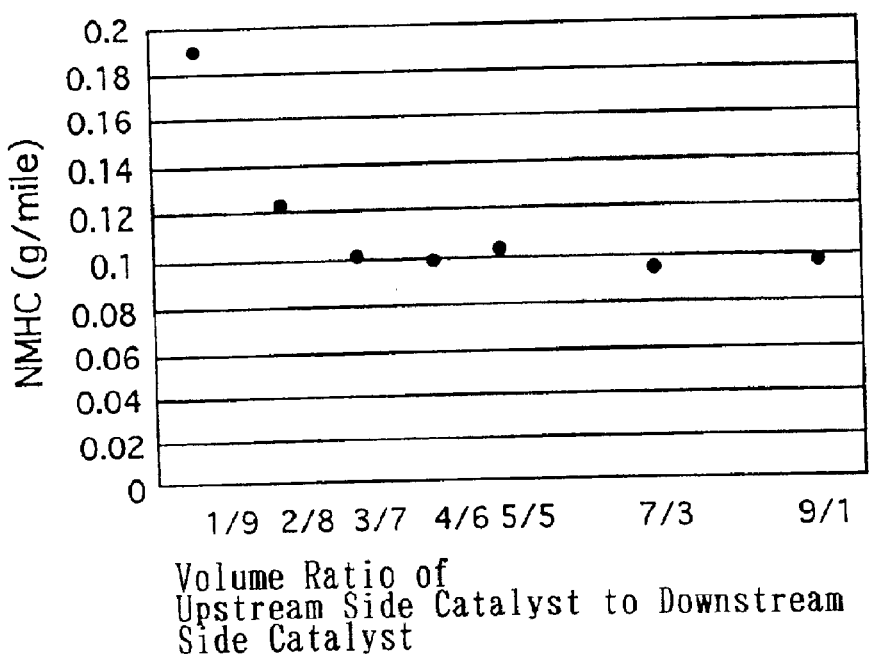
FIG. 4 is a graph for showing the HC conversions exhibited by the respective catalysts of Example No. 1, HC conversions which depended on the differences of the volume ratios of the upstream side catalysts to the downstream side catalysts.
Figure 5:
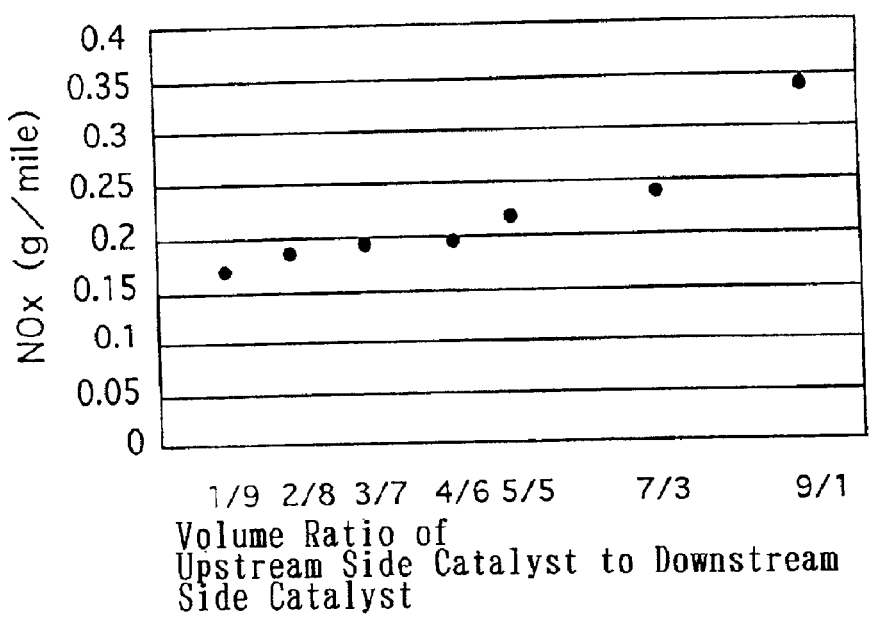
FIG. 5 is a graph for showing the $NO_x$ conversions exhibited by the respective catalysts of Example No. 1, $NO_x$ conversions which depended on the differences of the volume ratios of the upstream side catalysts to the downstream side catalysts.

In FIGS. 4 and 5, there are illustrated the results of an examination for the HC conversions and the $NO_x$ conversions, which were exhibited by catalysts made by varying the volume ratio of the upstream side catalyst to the downstream side catalyst in a range of from 1/9 to 9/1, respectively, in the catalyst described in Example No. 1. As a result, the drawings show that, when the volume ratio of the upstream side catalyst to the downstream side catalyst fell in a range of from 2/8 to 7/3, it was possible to satisfy the requirements of the HC and $NO_x$ conversions in a well balanced manner.

TABLE 1

|  | Coating Amount (g) | Alumina (g) | Lanthanum (g) | Barium (g) | Compound of Cerium (g) | Composition of Cerium Compound | Noble Metal | Amount of Noble Metal (g) |
|---|---|---|---|---|---|---|---|---|
| Ex. No. 1 | 154 | 113 | 3.9 | 23.3 | 0 | None | Pd | 1.5 |
| Ex. No. 2 | 154 | 113 | 3.9 | 23.3 | 0 | None | Pd & Pt | 1.5 |
| Ex. No. 3 | 154 | 113 | 3.9 | 23.3 | 0 | None | Pd & Rh | 1.5 |
| Ex. No. 4 | 178 | 113 | 3.9 | 46.6 | 0 | None | Pd | 1.5 |
| Ex. No. 5 | 142 | 113 | 3.9 | 11.7 | 0 | None | Pd | 1.5 |
| Comp. Ex. No. 1 | 240 | 113 | 3.9 | 23.3 | 86 | Cerium Oxide | Pd | 1.5 |
| Comp. Ex. No. 2 | 240 | 113 | 3.9 | 23.3 | 86 | Ce—Zr Solid Solution | Pd | 1.5 |
| Comp. Ex. No. 3 | 240 | 113 | 3.9 | 23.3 | 86 | Ce—Zr—Y Solid Solution | Pd | 1.5 |
| Comp. Ex. No. 4 | 197 | 113 | 3.9 | 23.3 | 43 | Cerium Oxide | Pd | 1.5 |

(Evaluation on the Catalysts)

Figure 1:
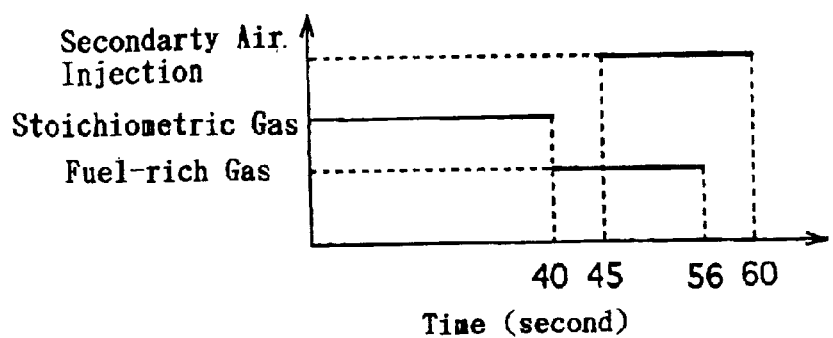
FIG. 1 is a chart for illustrating the conditions of a durability test, to which the respective catalysts of examples and comparative examples were subjected.

The respective catalysts, which were obtained in Example Nos. 1 through 5 and Comparative Example Nos. 1 through 4, were mounted onto a 4,000 c.c. displacement gasoline engine, and were subjected to a durability test, which was carried out under the condition that the inlet gas temperature was 900° C. for 50 hours. In FIG. 1, there is shown a chart, which illustrates the durability test in detail. First of all, the stoichiometric gas was flowed in the respective catalysts for 40 seconds, and thereafter a fuel-rich gas was flowed in the respective catalysts for 16 seconds. While, 5 seconds after the stoichiometric gas was turned into a gas, which was under a fuel-rich condition, a secondary air was introduced into the respective catalysts for 15 seconds. Thus, a cycle of 60 seconds in total was carried out repeatedly for 3,000 times (i.e., 50 hours). Thereafter, the respective catalysts were mounted onto a 1,500 c.c. displacement vehicle engine, and the exhaust gas purifying performances were evaluated in the "EPA75" evaluation mode. The results of the evaluation on the conversions of the hydrocarbons are illustrated in FIG. 2 as a bar graph, and the results of the evaluation on the conversions of the $NO_x$ are illustrated in FIG. 3 as a bar graph.

Figure 2:
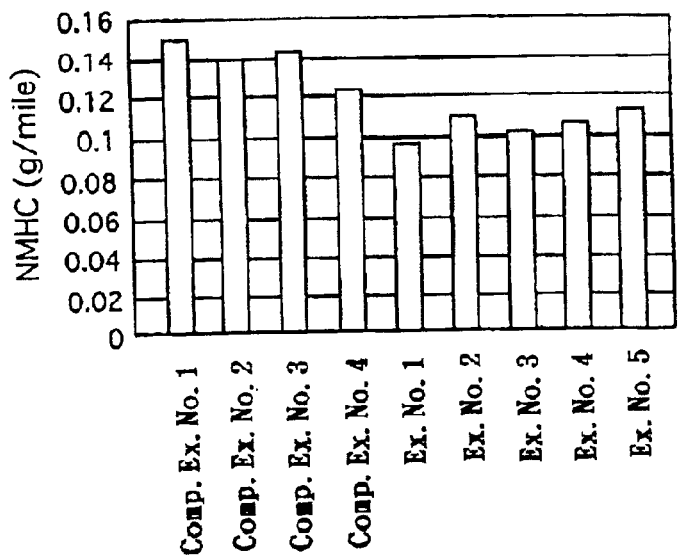
FIG. 2 is a bar graph for showing the HC conversions, which were exhibited by the respective catalysts of Example Nos. 1 through 5 and Comparative Example Nos. 1 through 4.

As illustrated in FIG. 2, the respective catalysts of Example Nos. 1 through 5 exhibited lower HC remaining ratios and higher conversions (or lower HC emissions) than those of the respective catalysts of Comparative Example Nos. 1 through 4. It is also understood from the drawing, among the respective catalysts of the examples, the catalyst of Example No. 1 was superior in terms of the HC conversions.

EXAMPLE NO. 6

(Upstream Side Catalyst)

120 g of an alumina, containing 3.9 g of lanthanum, 39.6 g of barium sulfate, 5.2 g of cerium oxide, which was equivalent to 0.03 mol with respect to 1 liter of a resulting upstream side catalyst, and 40 g of an alumina sol were mixed and stirred, and were thereafter made into a slurry. To this slurry, a palladium aqueous solution, which was equivalent to 1.5 g by conversion into Pd, was added, and was fully stirred so as to load the palladium on the alumina and the cerium oxide, thereby preparing a slurry for coating.

The resulting slurry was coated on a support, whose volume was about 500 cm$^3$ and which was made from cordierite, and was dried thereafter. Thus, the support was made into an upstream side catalyst. Note that the ratio of Pd to Ba was 1.0:15.5 (i.e., Pd:Ba=1.0:15.5) by elemental weight.

(Downstream Side Catalyst)

120 g of an alumina, containing 3.9 g of lanthanum, 52 g of a cerium oxide solid solution, including zirconium and yttrium, and 40 g of an alumina sol were mixed, were stirred fully and were thereafter made into a slurry. Note that the elemental composition ratio of the respective elements was Ce:Zr:Y=50:45:5.0 by elemental weight in the cerium oxide solid solution. To this slurry, a platinum aqueous solution was added, and was fully stirred so as to load the platinum on the alumina and the cerium oxide solid solution including zirconium and yttrium, thereby making a slurry for coating. As for the platinum aqueous solution, it was equivalent to 1.0 g by conversion into Pt. The resulting slurry was coated on a support, whose volume was about 1,000 cm$^3$ and which was made from cordierite, and was dried. The support was thereafter immersed into a rhodium aqueous solution to load Rh on the support in an amount of 0.2 g with respect to 1 liter of a resulting downstream side catalyst, was dried, and was thereafter made into a downstream side catalyst.

The upstream side catalyst and the downstream side catalyst were combined to make a pair, and were labeled as a catalyst of Example No. 6.

Note that a ratio of the volume of the upstream side catalyst to the volume of the downstream side catalyst was 1.0:2.0 (i.e., the upstream side catalyst:the downstream side catalyst=1.0:2.0 by volume).

EXAMPLE NO. 7

Except that, with respect to 1 liter of a resulting catalyst, 5.2 g of an oxide solid solution, including cerium and zirconium, substituted for the cerium oxide of the upstream side catalyst in Example No. 6, an upstream side catalyst of Example No. 7 was prepared in the same manner as that of Example No. 6. Note that a ratio of the respective elements was Ce:Zr=45:5.0 by elemental weight in the oxide solid solution.

As for a downstream side catalyst, a catalyst was used which was prepared in the same manner as that of Example No. 6.

EXAMPLE NO. 8

Except that, with respect to 1 liter of a resulting catalyst, 5.2 g of an oxide solid solution, including cerium, zirconium and yttrium, substituted for the cerium oxide of the upstream side catalyst in Example No. 6, an upstream side catalyst of Example No. 8 was prepared in the same manner as that of Example No. 6. Note that a ratio of the respective elements was Ce:Zr:Y=50:45:5.0 by elemental weight in the oxide solid solution.

As for a downstream side catalyst, a catalyst was used which was prepared in the same manner as that of Example No. 6.

EXAMPLE NO. 9

Except that an oxide solid solution, including cerium, zirconium and yttrium, substituted for the cerium oxide of the upstream side catalyst in Example No. 6, that the oxide solid solution was used in a reduced amount of 1.53 g with respect to 1 liter of a resulting catalyst, and that the coating amount was decreased to 155 g with respect to 1 liter of a resulting catalyst, an upstream side catalyst of Example No. 9 was prepared in the same manner as that of Example No. 6. Note that a ratio of the respective elements was Ce Zr:Y=50:45:5.0 by elemental weight in the oxide solid solution.

As for a downstream side catalyst, a catalyst was used which was prepared in the same manner as that of Example No. 6.

EXAMPLE NO. 10

Except that the oxide solid solution, including cerium, zirconium and yttrium, of the upstream side catalyst in Example No. 8 was used in an increased amount of 7.64 g with respect to 1 liter of a resulting catalyst, and that the coating amount was increased to 162 g with respect to 1 liter of a resulting catalyst, an upstream side catalyst of Example No. 10 was prepared in the same manner as that of Example No. 8. Note that a ratio of the respective elements was Ce:Zr:Y=50:45:5.0 by elemental weight in the oxide solid solution.

As for a downstream side catalyst, a catalyst was used which was prepared in the same manner as that of Example No. 6.

EXAMPLE NO. 11

Except that the oxide solid solution, including cerium, zirconium and yttrium, of the upstream side catalyst in Example No. 8 was used in an increased amount of 15.3 g with respect to 1 liter of a resulting catalyst, and that the coating amount was increased to 169 g with respect to 1 liter of a resulting catalyst, an upstream side catalyst of Example No. 11 was prepared in the same manner as that of Example No. 8. Note that a ratio of the respective elements was Ce:Zr:Y=50:45:5.0 by elemental weight in the oxide solid solution.

As for a downstream side catalyst, a catalyst was used which was prepared in the same manner as that of Example No. 6.

EXAMPLE NO. 12

Except that 0.75 g of Pd and 0.75 g of Pt substituted for 1.5 g of Pd in the upstream side catalyst in Example No. 8, an upstream side catalyst of Example No. 12 was prepared in the same manner as that of Example No. 8.

As for a downstream side catalyst, a catalyst was used which was prepared in the same manner as that of Example No. 6.

EXAMPLE NO. 13

Except that 1.2 g of Pd and 0.3 g of Rh substituted for 1.5 g of Pd in the upstream side catalyst in Example No. 8, an upstream side catalyst of Example No. 13 was prepared in the same manner as that of Example No. 8.

As for a downstream side catalyst, a catalyst was used which was prepared in the same manner as that of Example No. 6.

EXAMPLE NO. 14

(Upstream Side Catalyst)

Except that the cerium oxide in Example No. 6 was not added, and that the coating amount was decreased to 154 g with respect to 1 liter of a resulting catalyst, an upstream side catalyst was prepared in the same manner as that of Example No. 6, and was labeled as an upstream side catalyst of Example No. 14.

As for a downstream side catalyst, a catalyst was used which was prepared in the same manner as that of Example No. 6.

COMPARATIVE EXAMPLE NO. 5

(Upstream Side Catalyst)

120 g of an alumina, containing 3.9 g of lanthanum, 39.6 g of barium sulfate, 86 g of cerium oxide, which was equivalent to 0.5 mol of cerium elements with respect to 1 liter of a resulting upstream side catalyst, and 40 g of an alumina sol were mixed and stirred, and were thereafter made into a slurry. To this slurry, a palladium aqueous solution, which was equivalent to 1.5 g by conversion into Pd, was charged, and was fully stirred so as to load the palladium on the alumina and the cerium oxide, thereby preparing a slurry for coating. The resulting slurry was coated on a support, whose volume was about 500 $cm^3$ and which was made from cordierite, was dried, and was thereafter made into an upstream side catalyst.

(Downstream Side Catalyst)

120 g of an alumina, containing 3.9 g of lanthanum, 52 g of a cerium oxide solid solution, including zirconium and yttrium, and 40 g of an alumina sol were mixed, were stirred fully and were thereafter made into a slurry. Note that the elemental composition ratio of the cerium oxide solid solution was Ce:Zr:Y=50:45:5.0 by elemental weight. To this slurry, a platinum aqueous solution was added, and was fully stirred so as to load the platinum on the alumina and the cerium oxide solid solution including zirconium and yttrium, thereby making a slurry for coating. As for the platinum aqueous solution, it was equivalent to 1.0 g by conversion into Pt. The resulting slurry was coated on a support, whose volume was about 1,000 cm$^3$ and which was made from cordierite, and was dried. The support was thereafter immersed into a rhodium aqueous solution to load Rh on the support in an amount of 0.2 g with respect to 1 liter of a resulting downstream side catalyst, was dried, and was thereafter made into a downstream side catalyst.

Table 2 summarizes the contents of the respective components in the loading layers as well as the loading amounts of the respective noble metals therein with respect to 1 liter of the respective upstream side catalysts in above-described Example Nos. 6 through 14 and Comparative Example No. 5.

Figure 7:
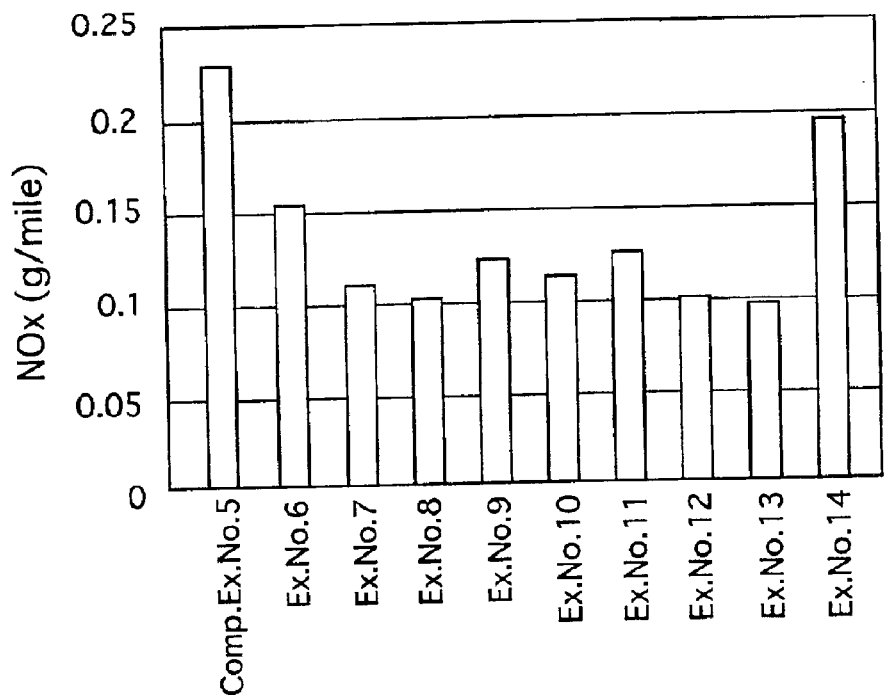
FIG. 7 is a bar graph for showing the $NO_x$ conversions, which were exhibited by the respective catalysts of Example Nos. 6 through 14 and Comparative Example No. 5.

$NO_x$ as notably as Example Nos. 6 through 13, but exhibited a lower $NO_x$ emission than that exhibited by Comparative Example No. 5 (e.g., less than 0.2 g/mile). Thus, as illustrated in FIG. 7, Comparative Example No. 5 was proved to purify the $NO_x$ much more insufficiently than all of Example Nos. 6 through 14.

Example Nos. 6 through 14 of the present exhaust gas purifying catalyst were good in terms of the HC and $NO_x$ conversions, and accordingly reduced the emissions of unpurified substances.

Figure 8:
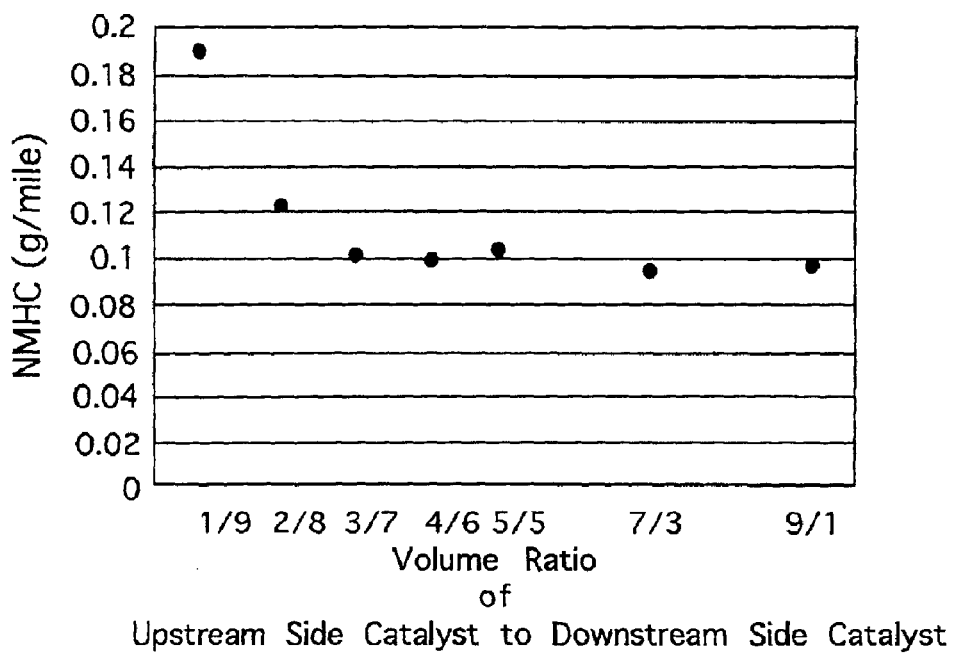
FIG. 8 is a graph for showing the HC conversions exhibited by the respective catalysts of Example No. 6, HC conversions which depended on the differences of the volume ratios of the upstream side catalysts to the downstream side catalysts.
Figure 9:
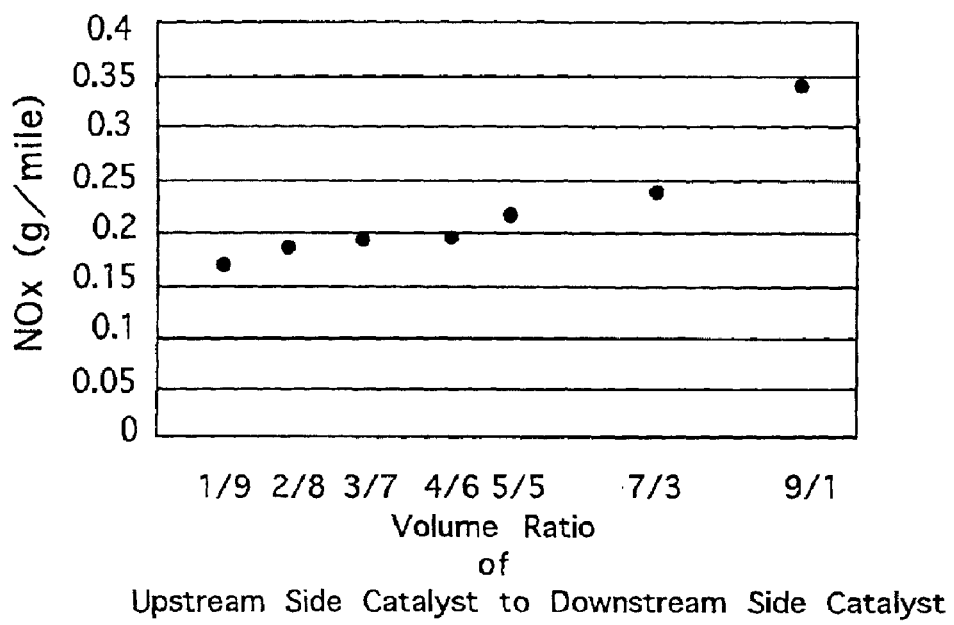
FIG. 9 is a graph for showing the $NO_x$ conversions exhibited by the respective catalysts of Example No. 6, $NO_x$ conversions which depended on the differences of the volume ratios of the upstream side catalysts to the downstream side catalysts.
Figure 10:
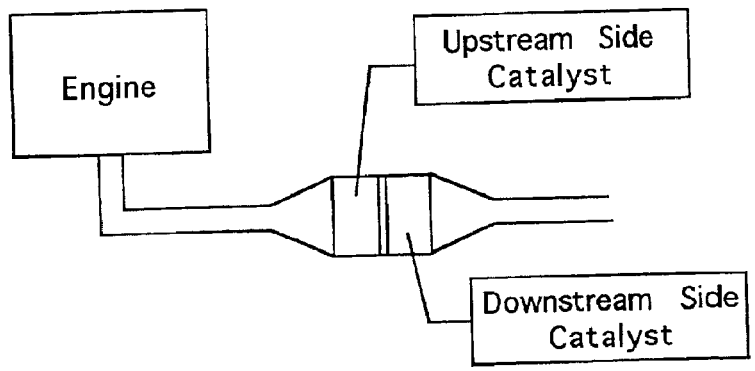
FIG. 10 is a schematic diagram for illustrating how an upstream side catalyst and a downstream side catalyst are disposed in a catalyst for purifying an exhaust gas according to the present invention.
Figure 11:
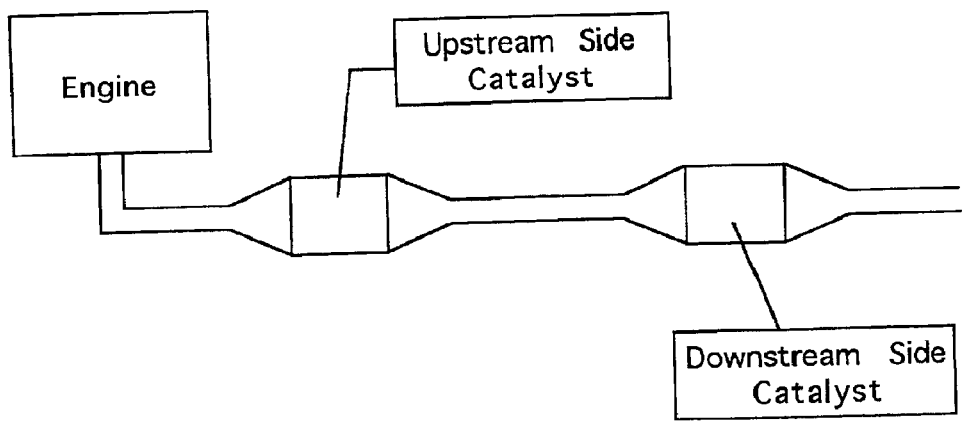
FIG. 11 is another schematic diagram for illustrating how an upstream side catalyst and a downstream side catalyst are disposed in a catalyst for purifying an exhaust gas according to the present invention.

In FIG. 8 and FIG. 9, there are illustrated the results of an examination for the HC conversions and the $NO_x$ conversions, which were exhibited by catalysts made by varying the volume ratio of the upstream side catalyst to the downstream side catalyst in a range of from 1/9 to 9/1, respectively, in the catalyst described in Example No. 6. As a result, the drawings show that, when the volume ratio of the upstream side catalyst to the downstream side catalyst fell in a range of from 2/8 to 7/3, it was possible to satisfy the requirements on the HC and $NO_x$ conversions.

Having now fully described the present invention, it will be apparent to one of ordinary skill in the art that many

TABLE 2

| | Coating Amount (g) | Alumina (g) | Lanthanum (g) | Barium (g) | Compound of Cerium (g) | Composition of Cerium Compound | Noble Metal | Amount of Noble Metal (g) |
|---|---|---|---|---|---|---|---|---|
| Ex. No. 6 | 159 | 113 | 3.9 | 23.3 | 5.2 | Cerium Oxide | Pd | 1.5 |
| Ex. No. 7 | 159 | 113 | 3.9 | 23.3 | 5.2 | Ce—Zr Solid Solution | Pd | 1.5 |
| Ex. No. 8 | 159 | 113 | 3.9 | 23.3 | 5.2 | Ce—Zr—Y Solid Solution | Pd | 1.5 |
| Ex. No. 9 | 155 | 113 | 3.9 | 23.3 | 1.53 | Ce—Zr—Y Solid Solution | Pd | 1.5 |
| Ex. No. 10 | 162 | 113 | 3.9 | 23.3 | 7.64 | Ce—Zr—Y Solid Solution | Pd | 1.5 |
| Ex. No. 11 | 169 | 113 | 3.9 | 23.3 | 15.3 | Ce—Zr—Y Solid Solution | Pd | 1.5 |
| Ex. No. 12 | 159 | 113 | 3.9 | 23.3 | 5.2 | Ce—Zr—Y Solid Solution | Pd & Pt | 1.5 |
| Ex. No. 13 | 159 | 113 | 3.9 | 23.3 | 5.2 | Ce—Zr—Y Solid Solution | Pd & Rh | 1.5 |
| Ex. No. 14 | 154 | 113 | 3.9 | 23.3 | 0 | None | Pd | 1.5 |
| Comp. Ex. No. 5 | 240 | 113 | 3.9 | 23.3 | 86.0 | Cerium Oxide | Pd | 1.5 |

(Evaluation on the Catalysts)

Except that the respective catalysts, which were obtained in Example Nos. 6 through 14 and Comparative Example No. 5, were mounted onto a 2,000 c.c. displacement gasoline engine, they were subjected to a durability test in the same manner as the respective catalysts of Example Nos. 1 through 5 and Comparative Example Nos. 1 through 4 were subjected thereto. Thereafter, the respective catalysts of Example Nos. 6 through 14 and Comparative Example No. 5 were mounted onto a 1,500 c.c. displacement vehicle engine, and the exhaust gas purifying performances were evaluated in the "EPA75" evaluation mode in the same manner as the respective catalysts of Example Nos. 1 through 5 and Comparative Example Nos. 1 through 4 were evaluated. The results of the evaluation on the conversions of the HC are illustrated in FIG. 6 as a bar graph, and the results of the evaluation on the conversions of the $NO_x$ are illustrated in FIG. 7 as a bar graph.

Figure 6:
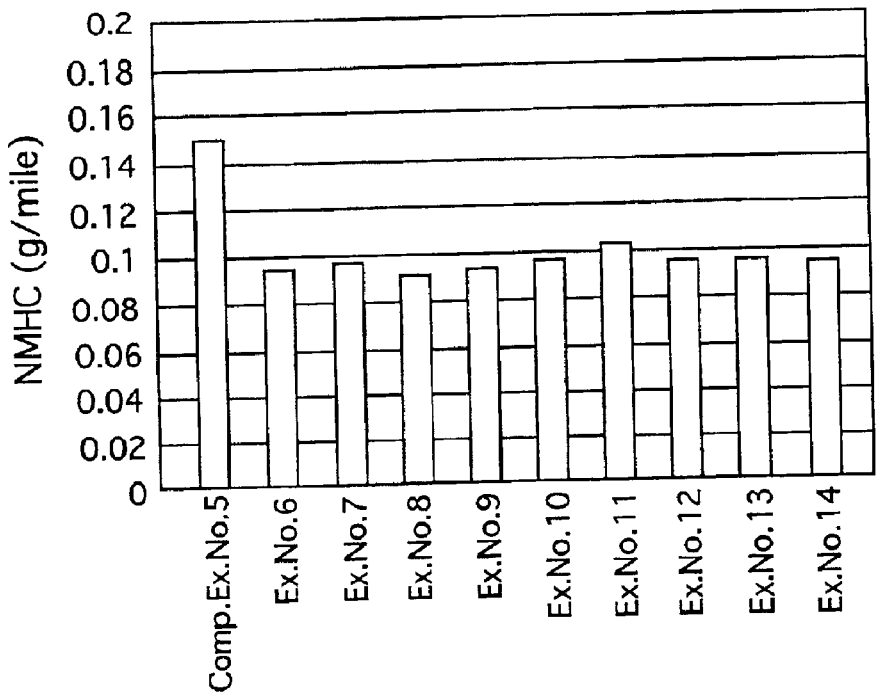
FIG. 6 is a bar graph for showing the HC conversions, which were exhibited by the respective catalysts of Example Nos. 6 through 14 and Comparative Example No. 5.

As illustrated in FIG. 6, compared with Comparative Example No. 5 in which the content of the cerium elements were large in the upstream side catalyst, the respective catalysts of Example Nos. 6 through 14 exhibited much lesser HC emissions, and were accordingly verified to be good in terms of the purifying performances.

Note that Example No. 14 was a case where the upstream side catalyst was free from the cerium elements. Example No. 14 exhibited a remarkably low HC emission. However, as illustrated in FIG. 7, Example No. 14 did not purify the changes and modifications can be made thereto without departing from the spirit or scope of the present invention as set forth herein including the appended claims.

What is claimed is:

1. A catalyst for purifying an exhaust gas, comprising:

an upstream side catalyst disposed on an upstream side with respect to an exhaust gas flow and including: a first cylinder-shaped support having a plurality of through holes penetrating therethrough in an axial direction; a first fire resistant inorganic oxide loading layer being formed on inner surfaces demarcating the through holes; and a first catalyst ingredient being held by the first loading layer and being composed of a first noble metal;

a downstream side catalyst disposed on a downstream side with respect to the exhaust gas flow and including: a second cylinder-shaped support having a plurality of through holes penetrating therethrough in an axial direction; a second fire resistant inorganic oxide loading layer being formed on inner surfaces demarcating the through holes; and a second catalyst ingredient being held by the second loading layer and being composed of a second noble metal;

said upstream side catalyst being constituted by the first catalyst ingredient, being composed of at least one member selected from the group consisting of palladium, palladium and rhodium and palladium and platinum as the first noble metal, and the first loading layer, being composed of an alumina containing barium and lanthanum at least; and said downstream side catalyst being constituted by the second catalyst ingredient, being composed of at least one member selected from the group consisting of platinum, palladium and rhodium as the second noble metal, and the second loading layer, being composed of at least one member selected from the group consisting of an alumina containing lanthanum, cerium, a solid solution of cerium and zirconium and a solid solution of cerium, zirconium and yttrium.

2. The catalyst for purifying an exhaust gas according to claim 1, wherein a ratio of the palladium to the barium is Pd:Ba=1.0:100–1.0:1.0 by elemental weight in said upstream side catalyst.

3. The catalyst for purifying an exhaust gas according to claim 1, wherein a volume ratio of said upstream side catalyst to said downstream side catalyst is said upstream side catalyst: said downstream side catalyst=1.0:10–3.0:1.0.

4. The catalyst for purifying an exhaust gas according to claim 1, wherein said upstream side catalyst and said downstream side catalyst are formed on and/or within an identical support.

5. The catalyst for purifying an exhaust gas according to claim 1, wherein the lanthanum is dissolved in the alumina in the first loading layer of said upstream side catalyst.

6. The catalyst for purifying an exhaust gas according to claim 1, wherein the barium is dispersed as oxide particles with the alumina in the first loading layer of said upstream side catalyst.

7. The catalyst for purifying an exhaust gas according to claim 1, wherein the barium is contained in the first loading layer of said upstream side catalyst in an amount of from 1.0 to 100 g by elemental weight with respect to 1 liter of said upstream side catalyst.

8. The catalyst for purifying an exhaust gas according to claim 1, wherein the lanthanum is contained in the first loading layer of said upstream side catalyst in an amount of from 0.8 to 8.0 g by elemental weight with respect to 1 liter of said upstream side catalyst.

9. The catalyst for purifying an exhaust gas according to claim 1, wherein the alumina is an activated alumina.

10. The catalyst for purifying an exhaust gas according to claim 1, wherein the alumina is included in the first loading layer of said upstream side catalyst in an amount of from 50 to 200 g with respect to 1 liter of said upstream side catalyst.

11. The catalyst for purifying an exhaust gas according to claim 1, wherein the first catalyst ingredient is composed of the first novel metal in an amount of from 0.01 to 10 g with respect to 1 liter of said upstream side catalyst.

12. The catalyst for purifying an exhaust gas according to claim 1, wherein the first catalyst ingredient of said upstream side catalyst is composed of the palladium, and the palladium is loaded in the first loading layer in an amount of from 0.01 to 10 g with respect to 1 liter of said upstream side catalyst.

13. The catalyst for purifying an exhaust gas according to claim 1, wherein the first catalyst ingredient of said upstream side catalyst is composed of the palladium and the rhodium, the palladium is loaded in the first loading layer in an amount of from 0.01 to 5.0 g with respect to 1 liter of said upstream side catalyst, and the rhodium is loaded in the first loading layer in an amount of from 0 to 1.0 g with respect thereto.

14. The catalyst for purifying an exhaust gas according to claim 1, wherein the first catalyst ingredient of said upstream side catalyst is composed of the palladium and the platinum, the palladium is loaded in the first loading layer in an amount of from 0.01 to 5.0 g with respect to 1 liter of said upstream side catalyst, and the platinum is loaded in the first loading layer in an amount of from 0 to 5.0 g with respect thereto.

15. The catalyst for purifying an exhaust gas according to claim 1, wherein the first loading layer of said upstream side catalyst is further composed of at least one member selected from the group consisting of cerium, a solid solution of cerium and zirconium and a solid solution of cerium, zirconium and yttrium.

16. The catalyst for purifying an exhaust gas according to claim 15, wherein an amount of the cerium, contained in the first loading layer of said upstream side catalyst, falls in a range of from 0.01 to 0.1 mol with respect to 1 liter of said upstream side catalyst.

17. The catalyst for purifying an exhaust gas according to claim 16, wherein an amount of the cerium, contained in the first loading layer of said upstream side catalyst, falls in a range of from 0.01 to 0.05 mol with respect to 1 liter of said upstream side catalyst.

18. The catalyst for purifying an exhaust gas according to claim 15, wherein a quantitative ratio of the cerium to the zirconium falls in a range of Ce:Zr=2.0:1.0–1.0:2.0 by elemental weight in the first loading layer of said upstream side catalyst.

19. The catalyst for purifying an exhaust gas according to claim 15, wherein a quantitative ratio of the cerium to the zirconium as well as to the yttrium falls in a range of Ce:Zr:Y=2.0:1.0:0.1–0.42–1.0:2.0:0.2–0.84 by elemental weight in the first loading layer of said upstream side catalyst.

20. The catalyst for purifying an exhaust gas according to claim 1, wherein the barium is contained in an amount of from 10 to 30 g with respect to 100 g of the alumina in the first loading layer of said upstream side catalyst.

21. The catalyst for purifying an exhaust gas according to claim 1, wherein the lanthanum is contained in an amount of from 3.0 to 5.0 g with respective to 100 g of the alumina in the first loading layer of said upstream side catalyst.

22. The catalyst for purifying an exhaust gas according to claim 15, wherein the cerium is contained in an amount of from 0.6 to 2.0 g with respect to 100 g of the alumina in the first loading layer of said upstream side catalyst.

23. The catalyst for purifying an exhaust gas according to claim 1, wherein the second loading layer of said downstream side catalyst is composed of the lanthanum in an amount of from 0.8 to 4.5 g with respect to 1 liter of said downstream side catalyst.

24. The catalyst for purifying an exhaust gas according to claim 1, wherein the second loading layer of said downstream side catalyst is composed of the alumina in an amount of from 50 to 250 g with respect to 1 liter of said downstream side catalyst.

25. The catalyst for purifying an exhaust gas according to claim 1, wherein the second catalyst ingredient of said downstream side catalyst is composed of the second noble metal in an amount of from 0.05 to 10 g with respect to 1 liter of said downstream side catalyst.

26. The catalyst for purifying an exhaust gas according to claim 1, wherein the second catalyst ingredient of said downstream side catalyst is composed of the platinum in an amount of from 0.05 to 1.0 g with respect to 1 liter of said downstream side catalyst and the palladium in an amount of from 0.05 to 2.0 g with respect thereto.

27. The catalyst for purifying an exhaust gas according to claim 1, wherein the second catalyst ingredient of said downstream side catalyst is composed of the platinum in an amount of from 0.05 to 1.0 g with respect to 1 liter of said downstream side catalyst and the rhodium in an amount of from 0.05 to 0.3 g with respect thereto.

28. The catalyst for purifying an exhaust gas according to claim 1, wherein the second catalyst ingredient of said downstream side catalyst is composed of the palladium in an amount of from 0.05 to 2.0 g with respect to 1 liter of said downstream side catalyst and the rhodium in an amount of from 0.05 to 0.3 g with respect thereto.

29. The catalyst for purifying an exhaust gas according to claim 1, wherein the second catalyst ingredient of said downstream side catalyst is composed of the platinum in an amount of from 0.05 to 1.0 g with respect to 1 liter of said downstream side catalyst, the palladium in an amount of from 0.05 to 2.0 g with respect thereto and the rhodium in an amount of from 0.05 to 0.3 g thereto.

30. The catalyst for purifying an exhaust gas according to claim 1, wherein the lanthanum is contained in an amount of from 3.0 to 5.0 g with respect to 100 g of the alumina in the second loading layer of said downstream side catalyst.

31. The catalyst for purifying an exhaust gas according to claim 1, wherein the second loading layer of said downstream side catalyst is composed of the cerium in an amount of from 0.2 to 0.8 mol with respect to 1 liter of said downstream side catalyst.

32. The catalyst for purifying an exhaust gas according to claim 1, wherein the second loading layer of said downstream catalyst is composed of the solid solution of the cerium and the zirconium, and a ratio of the cerium to the zirconium falls in a range of Ce:Zr=2.0:1.0–1.0:2.0 by elemental weight.

33. The catalyst for purifying an exhaust gas according to claim 1, wherein the second loading layer of said downstream side catalyst is composed of the solid solution of the cerium, the zirconium and the yttrium, and a ratio of the zirconium to the yttrium falls in a range of Zr:Y=10:1.0–7.0:3.0 by elemental weight.

* * * * *